(12) United States Patent
Schaefer et al.

(10) Patent No.: US 10,840,851 B2
(45) Date of Patent: Nov. 17, 2020

(54) ROOF MOUNT BRACKET

(71) Applicant: D Three Enterprises LLC, Lafayette, CO (US)

(72) Inventors: Richard F. Schaefer, Fort Lupton, CO (US); David Kreutzman, Louisville, CO (US)

(73) Assignee: D Three Enterprises LLC

( * ) Notice: Subject to any disclaimer, the term of this patent is extended or adjusted under 35 U.S.C. 154(b) by 0 days.

(21) Appl. No.: 16/113,080

(22) Filed: Aug. 27, 2018

(65) Prior Publication Data

US 2019/0081590 A1 Mar. 14, 2019

Related U.S. Application Data

(60) Provisional application No. 62/555,971, filed on Sep. 8, 2017.

(51) Int. Cl.
| | | |
|---|---|---|
| *A47G 29/02* | (2006.01) |
| *H02S 30/10* | (2014.01) |
| *H02S 20/23* | (2014.01) |
| *E04D 13/00* | (2006.01) |
| *F16B 5/12* | (2006.01) |
| *F24S 10/00* | (2018.01) |

(52) U.S. Cl.
CPC .............. *H02S 30/10* (2014.12); *E04D 13/00* (2013.01); *F16B 5/125* (2013.01); *F24S 10/00* (2018.05); *H02S 20/23* (2014.12)

(58) Field of Classification Search
CPC ........ H01Q 1/1221; E04D 13/10; H02S 20/23
See application file for complete search history.

(56) References Cited

U.S. PATENT DOCUMENTS

| | | | | |
|---|---|---|---|---|
| 2,687,863 A * | 8/1954 | Vogt | ..................... | H01Q 1/1221 248/515 |
| 2,731,225 A * | 1/1956 | Cayo | ..................... | H01Q 1/1221 248/536 |
| 5,152,107 A * | 10/1992 | Strickert | ................. | E04D 13/10 52/24 |
| 5,609,326 A | 3/1997 | Stearns et al. | | |
| 6,141,928 A | 11/2000 | Platt | | |
| 6,360,491 B1 | 3/2002 | Ullman | | |
| 6,672,018 B2 | 1/2004 | Shingleton | | |
| 6,688,047 B1 * | 2/2004 | McNichol | ............... | E04D 13/10 52/25 |
| 7,435,134 B2 | 10/2008 | Lenox | | |

(Continued)

*Primary Examiner* — Amy J. Sterling
(74) *Attorney, Agent, or Firm* — Snell & Wilmer L.L.P.; Russell T. Manning

(57) ABSTRACT

The present disclosure is generally directed to mounting components on a corrugated metal roof. The disclosed systems and devices utilize a multi-surface clip (e.g., multi-planar) to securely attaching components such as rails to the corrugated metal roof while increasing the pullout strength of mounted structures and more evenly spreading the load of such mounted structures over the corrugated metal roof. In one embodiment, the multi-surface clip allows attaching a rail to the top of a rib of the corrugated metal roof while a fastener mechanically attaches the clip to a side surface of the rib. This allows the fastener to experience shear forces when upward forces (e.g., normal to the top surface of the rib) are applied to the rail or a structure supported by the rail.

6 Claims, 10 Drawing Sheets

(56) References Cited

U.S. PATENT DOCUMENTS

| | | |
|---|---|---|
| 7,780,472 B2 | 8/2010 | Lenox |
| 8,025,508 B2 | 9/2011 | Parker et al. |
| 8,276,330 B2 | 10/2012 | Harberts et al. |
| 8,413,944 B2 | 4/2013 | Harberts et al. |
| 8,448,405 B2 | 5/2013 | Schaefer et al. |
| 8,448,407 B1 | 5/2013 | Wiener |
| 8,475,185 B2 | 7/2013 | Rivera et al. |
| 8,479,455 B2 | 7/2013 | Schaefer et al. |
| 8,590,223 B2 | 11/2013 | Kilgore et al. |
| 8,661,765 B2 | 3/2014 | Kreutzman et al. |
| 8,689,517 B2 | 4/2014 | Kreutzman et al. |
| 8,707,654 B2 | 4/2014 | Kreutzman et al. |
| 8,707,655 B2 | 4/2014 | Kreutzman et al. |
| 8,752,338 B2 | 6/2014 | Schaefer et al. |
| 8,833,032 B2 | 9/2014 | Kreutzman et al. |
| 8,833,033 B2 | 9/2014 | Kreutzman et al. |
| 8,844,887 B2 * | 9/2014 | Genschorek .............. B30B 3/04 248/220.22 |
| 8,869,490 B2 | 10/2014 | Kreutzman et al. |
| 9,068,339 B2 | 6/2015 | Schaefer et al. |
| 9,106,023 B2 | 8/2015 | Schaefer et al. |
| 9,473,064 B2 | 10/2016 | Schaefer et al. |
| 9,620,870 B2 | 4/2017 | Schaefer et al. |
| 9,680,409 B2 | 6/2017 | Schaefer et al. |
| 9,714,671 B2 | 7/2017 | Schaefer et al. |
| 10,330,347 B2 * | 6/2019 | Yang ....................... H02S 20/23 |
| 2003/0015636 A1 | 1/2003 | Liebendorfer |
| 2003/0015637 A1 | 1/2003 | Liebendorfer |
| 2003/0070368 A1 | 4/2003 | Shingleton |
| 2003/0101662 A1 | 6/2003 | Ullman |
| 2008/0000173 A1 | 1/2008 | Lenox et al. |
| 2008/0010915 A1 | 1/2008 | Liebendorfer |
| 2008/0053008 A1 | 3/2008 | Ohkoshi et al. |
| 2008/0244881 A1 | 10/2008 | Zante |
| 2008/0302928 A1 | 12/2008 | Haddock |
| 2010/0175337 A1 | 7/2010 | Mascolo et al. |
| 2010/0192505 A1 | 8/2010 | Schaefer et al. |
| 2010/0281793 A1 | 11/2010 | McPheeters et al. |
| 2010/0307074 A1 | 12/2010 | Stearns et al. |
| 2011/0036028 A1 | 2/2011 | Beck |
| 2011/0179727 A1 | 7/2011 | Liu |
| 2011/0214365 A1 | 9/2011 | Aftanas |
| 2012/0097816 A1 | 4/2012 | Tamm et al. |
| 2012/0102853 A1 | 5/2012 | Rizzo |
| 2012/0181402 A1 | 7/2012 | Putz et al. |
| 2012/0205508 A1 | 8/2012 | Cusson et al. |
| 2012/0233958 A1 | 9/2012 | Stearns |
| 2012/0244729 A1 | 9/2012 | Rivera et al. |
| 2013/0102165 A1 | 4/2013 | Dupont |
| 2014/0102517 A1 | 4/2014 | Meine et al. |
| 2018/0152133 A1 | 5/2018 | Schaefer et al. |

\* cited by examiner

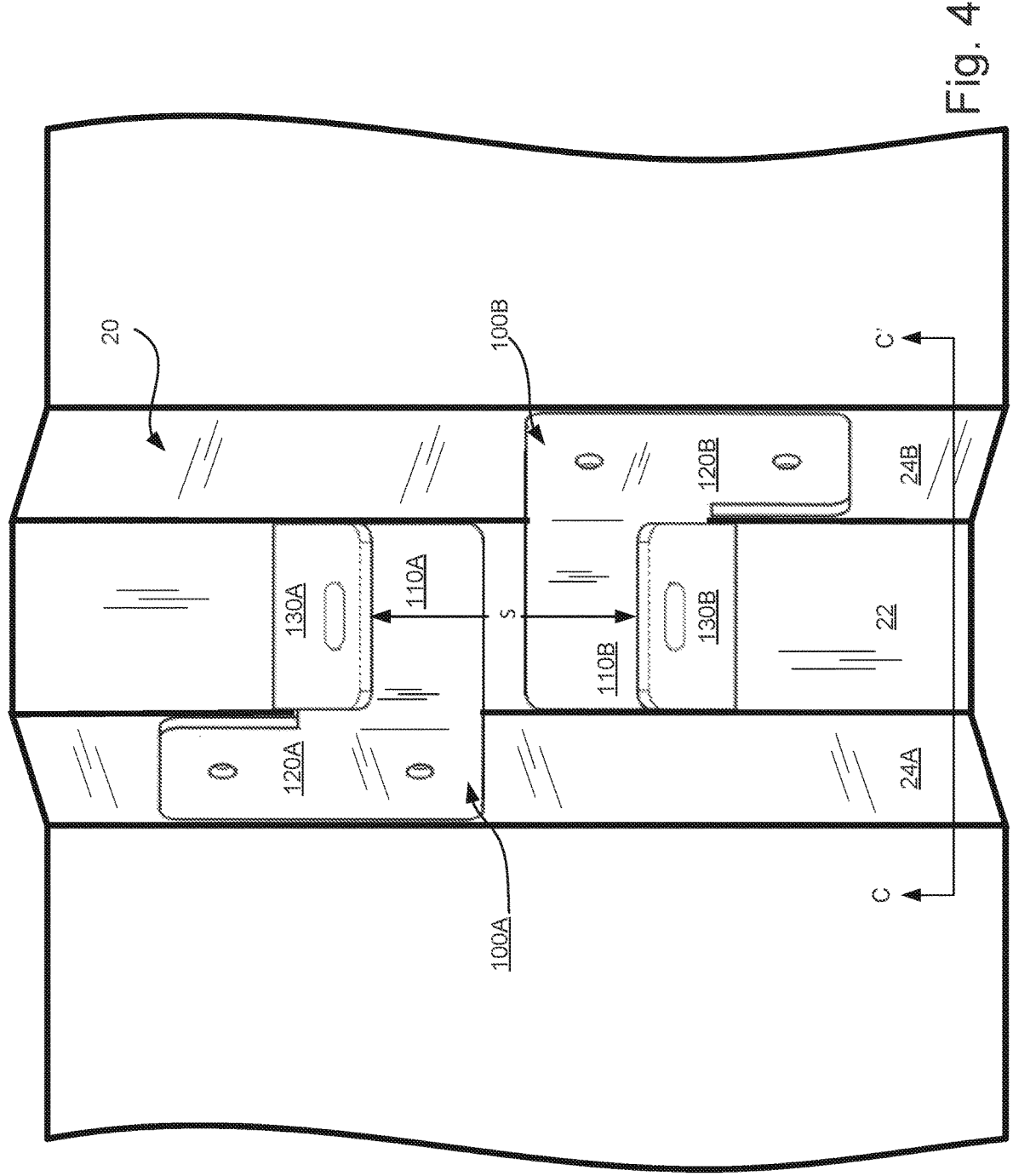

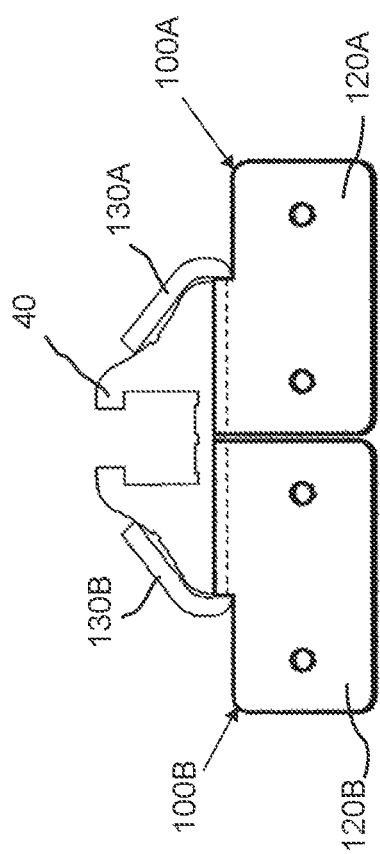

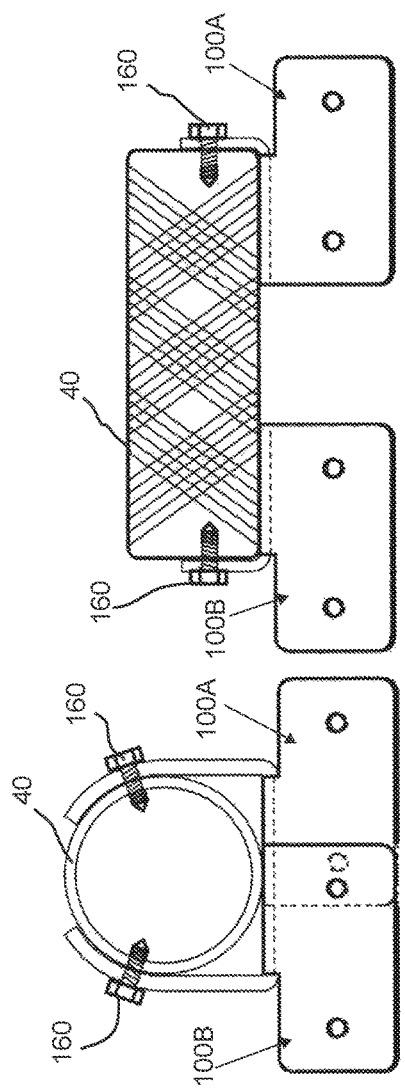
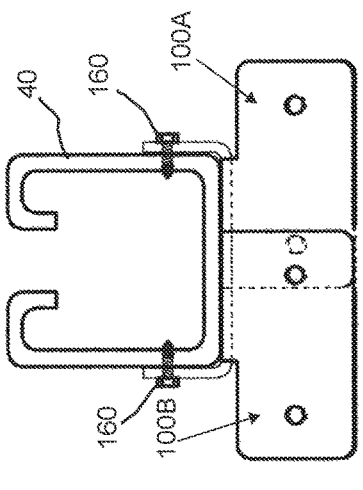
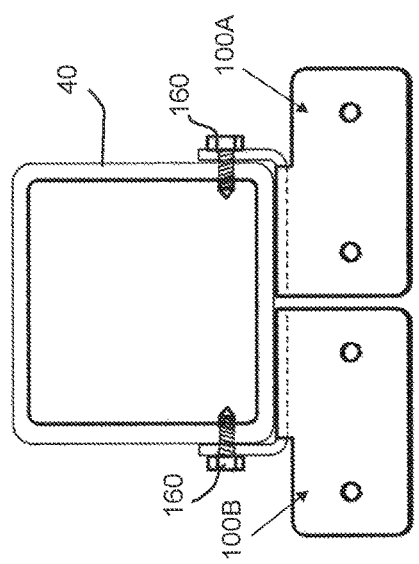
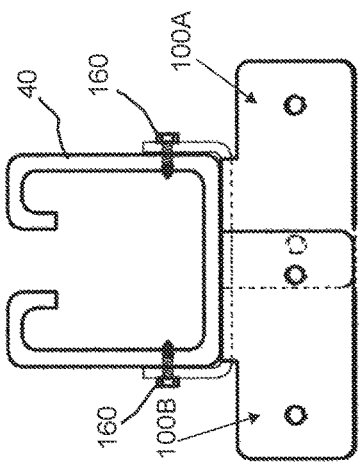

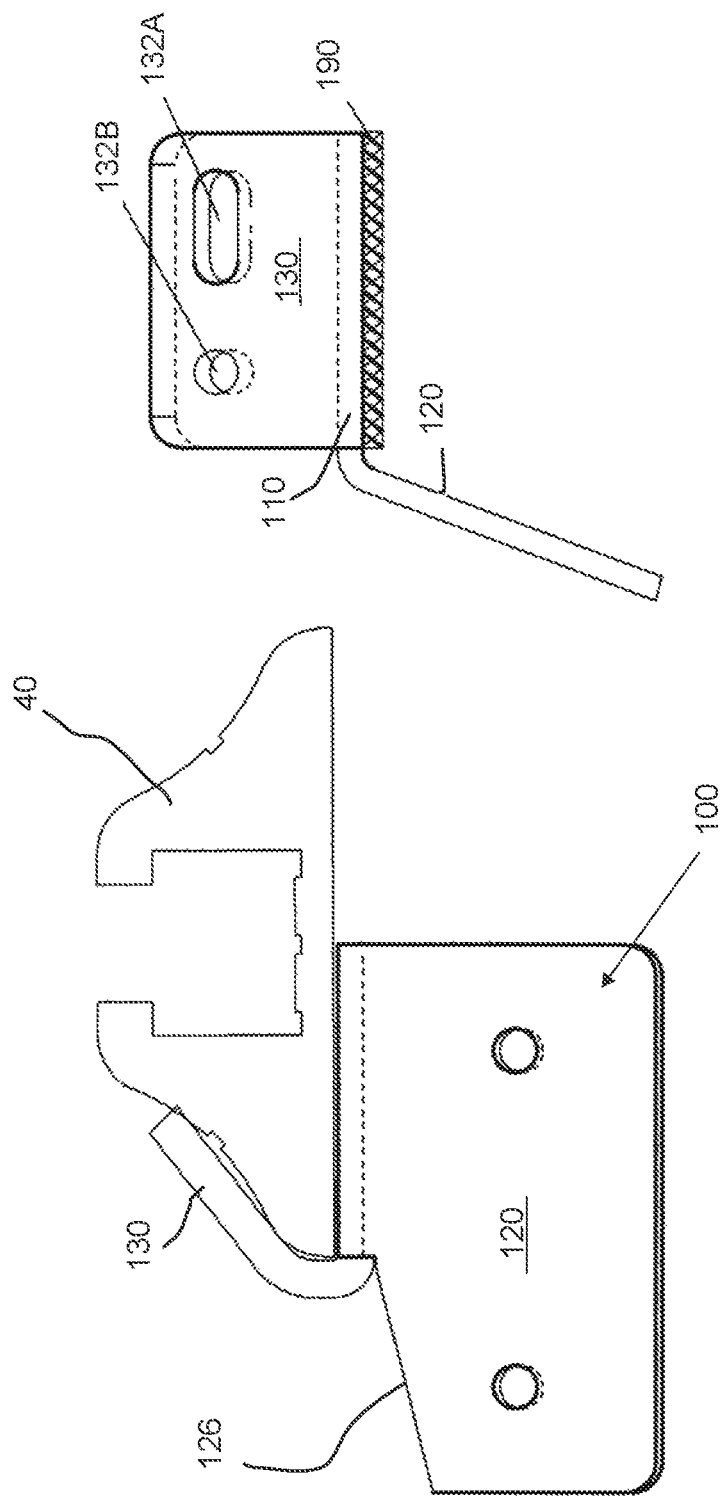

ROOF MOUNT BRACKET

CROSS REFERENCE

The present application claims the benefit of U.S. Provisional Application No. 62/555,971 having a filing date of Sep. 9, 2017, there entire contents of which is incorporated herein by reference.

FIELD

The present disclosure generally relates to rooftop mounting devices, which support assemblies such photovoltaic panels. More specifically, the present disclosure relates to a mounting bracket configured to secure components to corrugations of a metal roof.

BACKGROUND

Many structures utilize metal roof systems to protect their interior from exposure to the elements. Such metal roof systems vary in construction. In one metal roof configuration, overlapping corrugated metal panels are disposed on sloping roofs as weatherproof covering material. Each corrugated panel typically includes of a series of large web or pan sections separated by a series of raised rib sections. The raised rib sections generally have a geometric cross-section (e.g., trapezoidal) such that they are self-supporting as opposed to a standing seam metal roof. Each corrugated panel starts and ends with a rib section. When assembled to form a roof covering, a starting rib of a newly installed panel overlaps on the ending rib of the panel already in place, thereby providing a gravity borne mechanical seal. Often, the sheet metal panels are fixed to the roofs furring strips or studs using lag screws inserted through the raised ribs at sheet junction points to minimize leakage risks. Once assembled, water drains in the pan sections between the ribs and is directed over lower panels to an edge of the roof.

When attaching structures to a corrugated metal roof, it is typically preferred to attach the structures to the tops of the raised ribs to avoid puncturing the pan sections (e.g., drain floors) of the corrugated panels. While effective in limiting leaks, such connection often results in concentrated loads on the ribs. Further, such connection to the top of the ribs (i.e., rib top connection) provides limited wind resistance. More specifically, rib top connection have limited wind uplift load (pressures from wind flow that cause lifting effects) or pull out strength. That is, the overall pull out strength a structure is typically limited to a collective thread stripping strength between one or more threaded fasteners and the thin metal sheet(s) that form the top of the ribs.

SUMMARY

The present disclosure is directed to a clip or roof mount configured to mount elements to corrugated metal roofs. In an arrangement, the roof mount is configured for use with corrugated metal roofs having generally trapezoid shaped ribs (e.g., in cross-section) where each rib has a top surface and two sloping side surfaces. However, the roof mount is not limited to such applications. The roof mount is configured to rest on top of the corrugation such that an element connected to the roof mount rests on the top of the corrugation. However, the roof mount anchors to one of the side surfaces of the corrugation. In an embodiment, an anchor (e.g., screw) passes through an anchor portion of the roof mount that is configured to rest against a side surface of the rib while another portion of the roof mount rests on the top surface of the rib. Such an anchor experiences a shear force when an uplift is provided to an element attached to a roof by a roof mount. The shear force of the anchor is significantly greater (e.g., orders of magnitude) than the pull out or thread stripping strength of a threaded anchor. Thus the clip/roof mount provides, among other things, increased wind loading resistance.

In an arrangement, the clip is formed from a single sheet of metal in a bending process. In this arrangement, the clip typically includes three portions or sections, a section that is configured for positioning on the top surface of the rib, a section that is configured for positioning on a side surface of the rib and a section that extends above the top of the rib for attaching elements to the clip and hence the underlying rib. In an arrangement, the clip includes a central portion, an anchor portion and a tab portion. In such an arrangement, a first bend in the sheet metal forming the clip may define the central portion that rests on top of a rib from the anchor portion that rests against a side surface of the rib. In an arrangement, the central portion and the anchor portion are each planar surfaces. A second bend may define the central portion from the tab portion that extends above the rib. In various arrangements, the anchor, central and/or tab portions may include apertures to allow for inserting an anchor through the respective portions of the clip.

In an arrangement, the roof mount or clip is reversible. In such an arrangement, two identical clips may be attached to a single rib of a roof. These two clips may be reversed such that tab portions of the clips extending above the top surface of the ribs face one another defining a space therebetween. This space may be adjusted based on where the clips are anchored to the rib. Further, an elongated rail may be disposed between the tabs and connected to the tabs. Such a rail may extend transverse to the rib and extend over one or more adjacent ribs.

BRIEF DESCRIPTION OF THE DRAWINGS

FIG. 4 illustrates reversible application of two clips to a common rib of a corrugated metal roof.

FIG. 5 illustrates a side view of two clips utilized to engage a rail for attachment to a corrugated metal roof.

FIGS. 6A, 6B, 6C and 6D illustrate alternate embodiments of the attachment clips as utilized to engage a rail.

FIG. 9 illustrates a further alternate embodiment of the attachment clip.

FIG. 10 illustrates a further alternate embodiment of the attachment clip.

DETAILED DESCRIPTION

Before explaining the disclosed embodiment of the present disclosure in detail, it is to be understood that the devices of the disclosure are not limited in application to the details of the particular arrangement shown, since the arrangements are capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

The present disclosure is generally directed to mounting components on a corrugated metal roof. The disclosed systems and devices permit securely attaching components such as rails to the corrugated metal roof while increasing the pullout strength of mounted structures and more evenly spreading the load of such mounted structures over the corrugated metal roof. In one embodiment, a clip is provided that allows for attaching a rail to the top of a rib of the corrugated metal roof while a fastener mechanically attaches the clip to a side surface of the rib. This allows the fastener to experience shear forces when upward forces (e.g., normal to the top surface of the rib) are applied to the rail or a structure supported by the rail. The configuration of the clips allows for attachment to less than each adjacent rib (e.g., a rail may span one or more ribs without connection) while permitting a bottom surface of the rail to be disposed on top surface of spanned or unattached ribs of the corrugated metal roof. In this regard, any downward load applied to the rail (e.g., snow loading applied to supported solar panels) is applied to each rib of the corrugated metal roof over which the rail spans regardless if each rib is mechanically fastened to the rail.

Figure 1A:
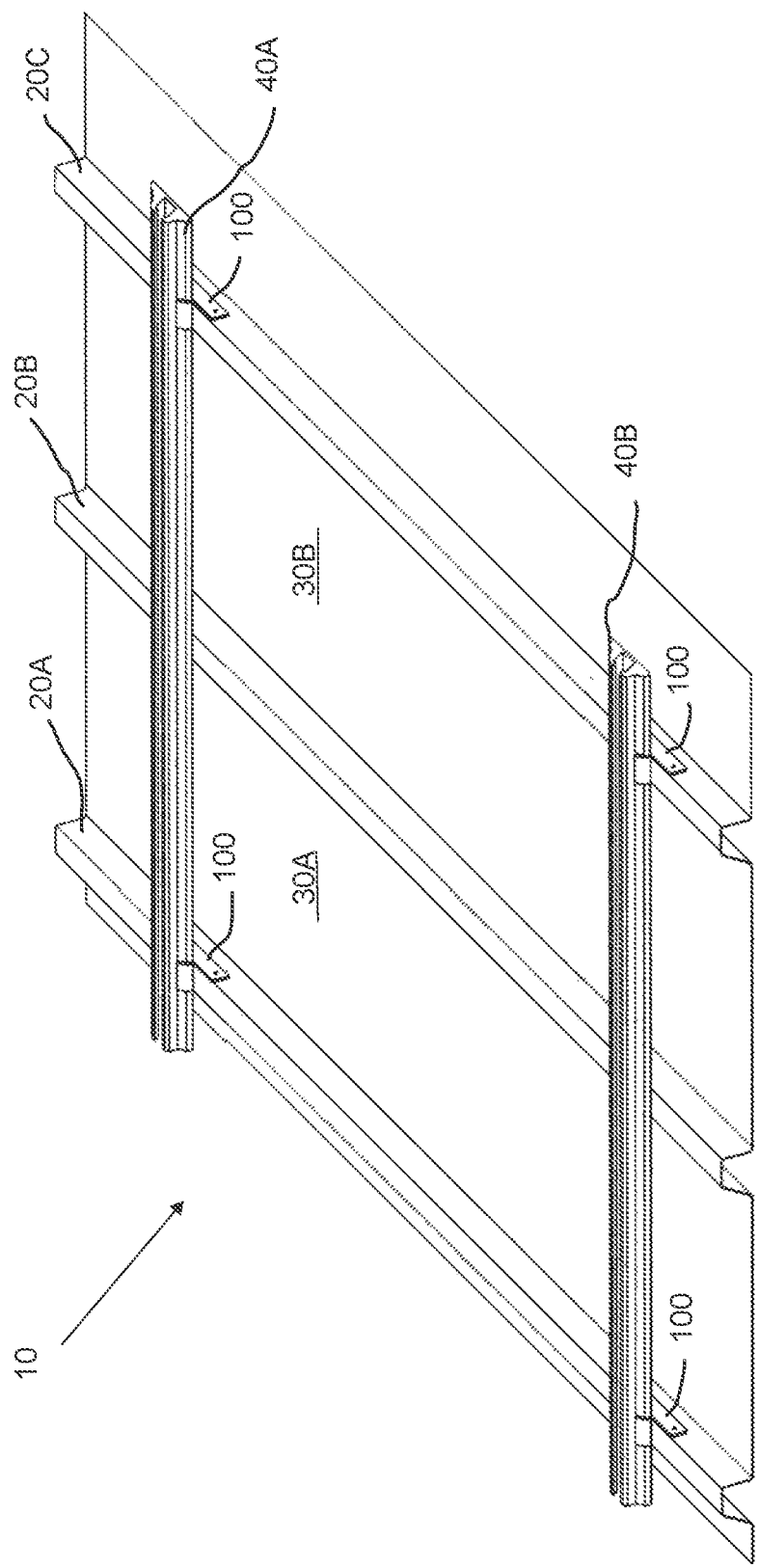
FIG. 1A illustrates a corrugated metal roof having attached rails.

FIG. 1A illustrates one exemplary embodiment of a section of a corrugated metal roof panel 10, which in the present embodiment includes three parallel raised ribs 20A, 20B and 20C (hereafter '20' unless specifically referenced), that are separated by pan sections 30A and 30B (hereafter '30' unless specifically referenced). The corrugated metal roof panel 10 starts and ends with a rib section and may include partial pan sections outside of the starting and ending ribs. When multiple panels are assembled to form a roof covering, a starting rib of a newly installed panel overlaps on the ending rib of a panel already in place, thereby providing a gravity borne mechanical seal. Such construction is well known to those skilled in the art. The illustrated panel 10 includes generally flat or planar pan sections 30 between each of the raised ribs 20. It will be appreciated, that these pan sections need not be flat or planar and may include smaller raised ribs (not shown) to improve the structural integrity of the panel. In such an arrangement, the pan section ribs are typically much shorter than the main raised ribs 20. Accordingly, the raised ribs 20 are sometimes referred to as high hats. For purposes of discussion herein, the 'raised ribs' typically correspond to the tallest ribs/high hats of a corrugated metal panel and not the shorter pan section ribs.

As shown in FIG. 1A, first and second rails 40A and 40B (hereafter '40' unless specifically referenced) are attached to the corrugated panel 10. It will be appreciated that the rails may extend over adjacent panels (not shown). Further, it will be appreciated that the panels may include different numbers of raised ribs. As shown, the rails 40 are attached to the panel in a generally perpendicular configuration relative to the raised ribs 20. In the present embodiment, the rails 40 are attached to the raised ribs utilizing a plurality of clips 100, which are more fully discussed herein. Of further note for the illustrated embodiment, the rails 40 are attached to the first rib 20A and third rib 20B without connection to the intervening rib 20B. Though shown as 'spanning' only a single rib 20B without mechanical connection, it will be appreciated that a rail may span a plurality of ribs free of connection. The diminutive thickness of the clips 100 permits a bottom surface of the rail 40 to substantially rest on the top surface of the connected rails as well as the top surfaces any ribs the rail spans free of connection via a clip.

Figure 1B:
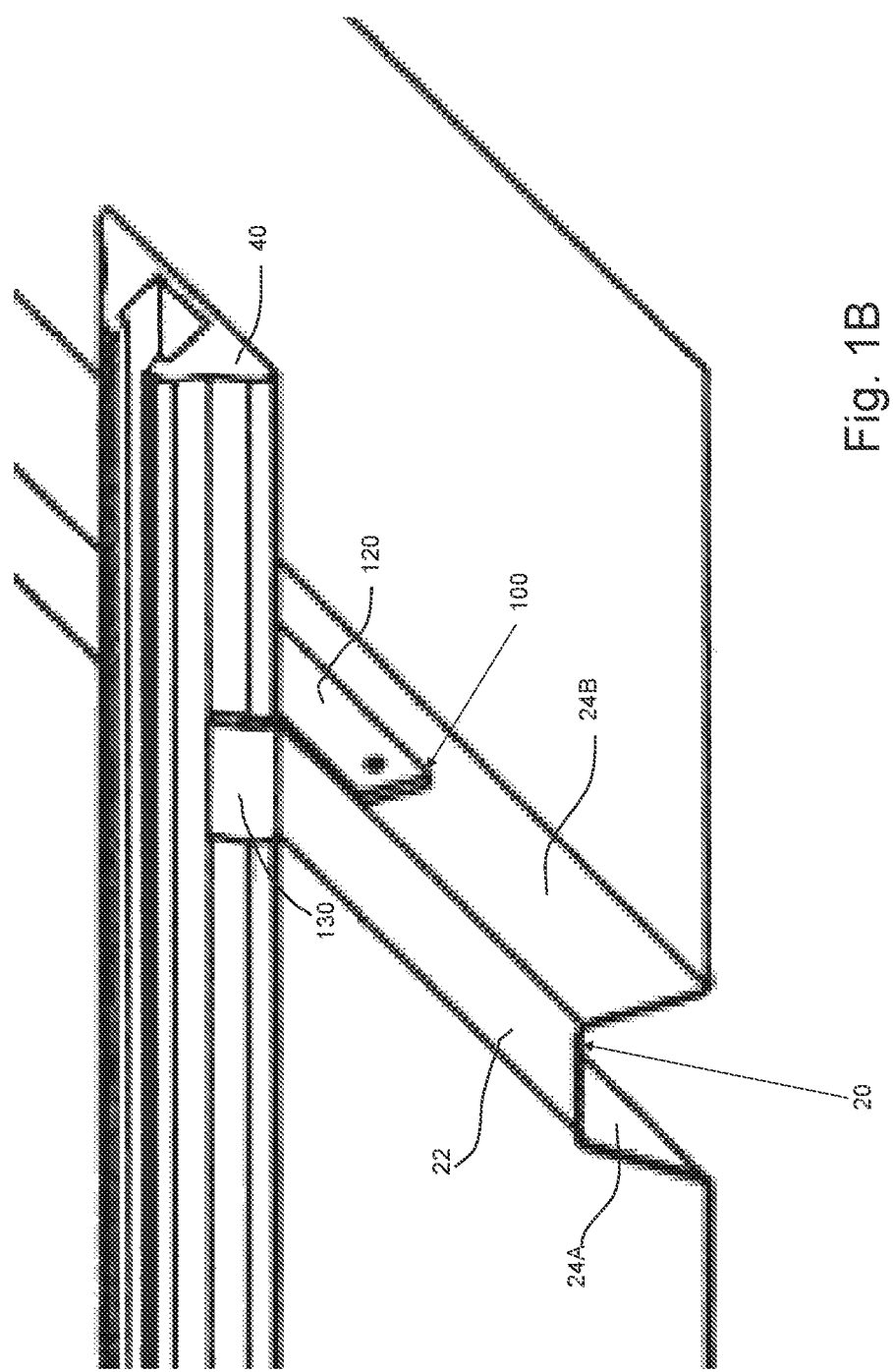
FIG. 1B illustrates a connection between one of the rails of FIG. 1 and the corrugated metal roof.
Figure 2:
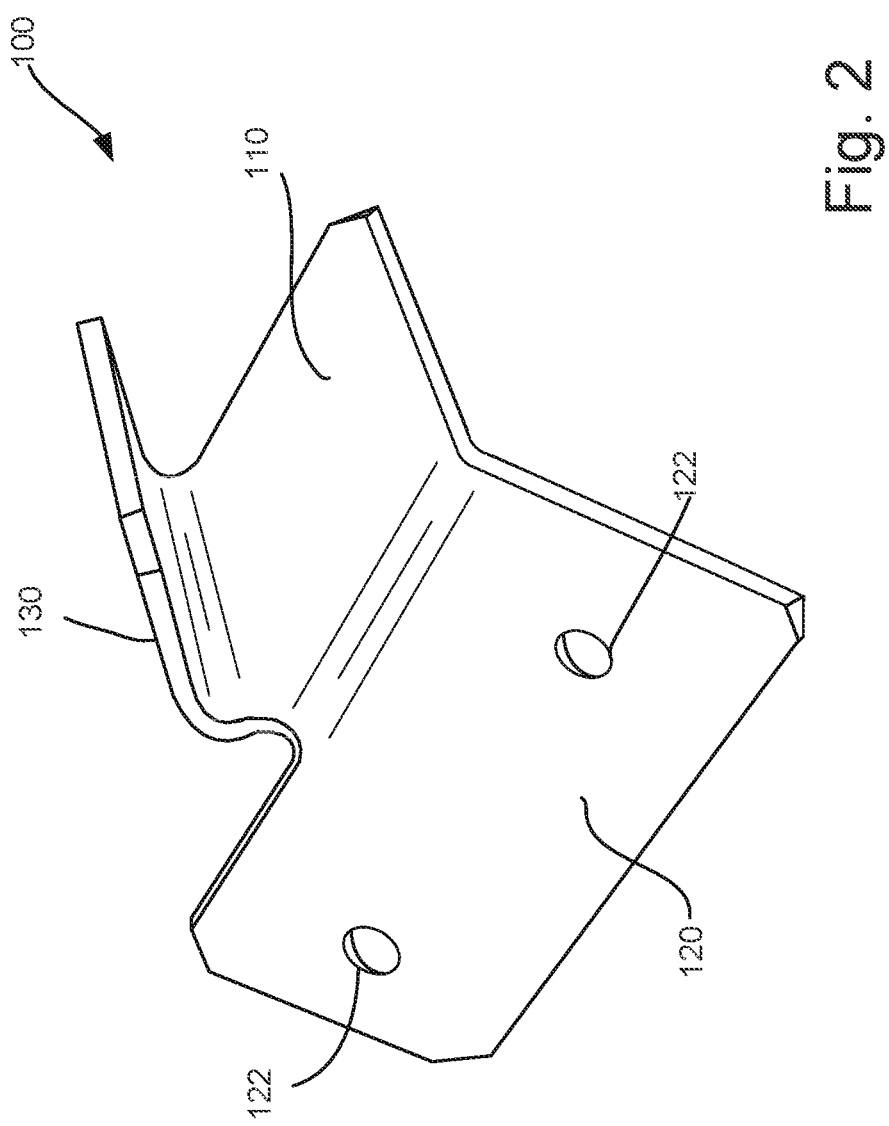
FIG. 2 illustrates a perspective view of one embodiment of an attachment clip for use in connecting structures to a corrugated metal roof.
Figure 3B:
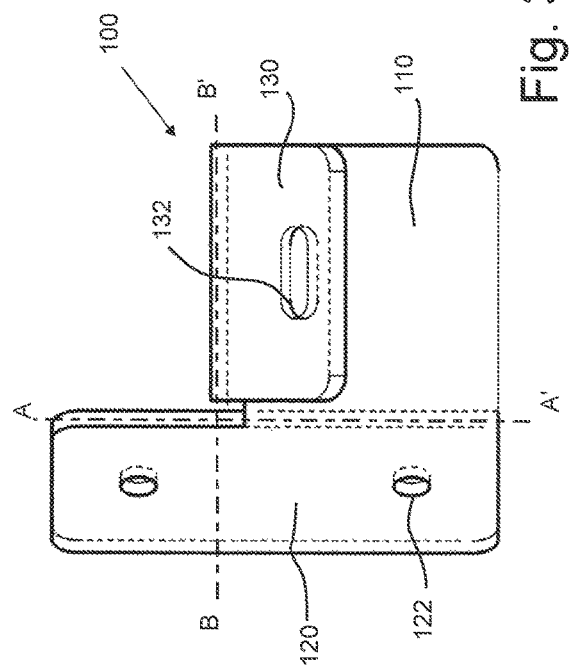
FIGS. 3A, 3B and 3C illustrate side, top and end views of the clip of FIG. 2.
Figure 3C:
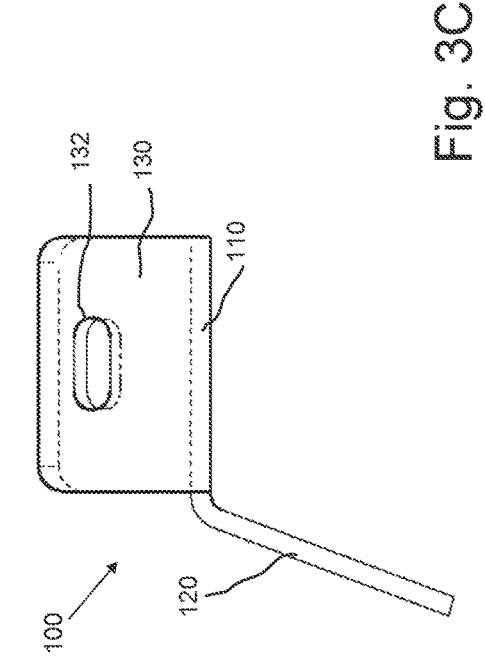
Figure 3A:
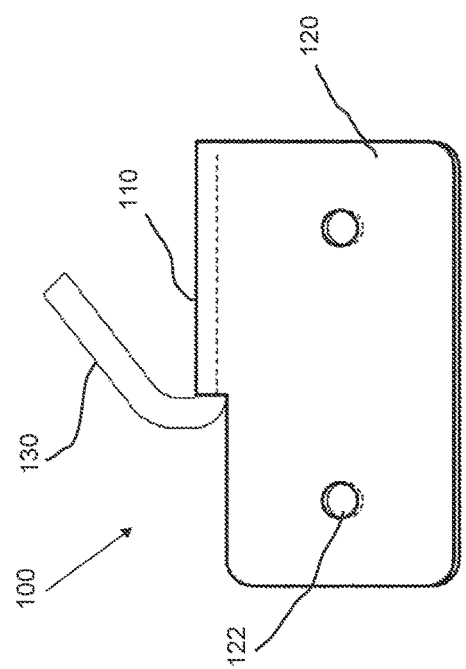

FIG. 1B illustrates a close-up view of a portion of FIG. 1A showing one non-limiting embodiment of a raised rib 20, attachment clip 100 and rail 40. In the illustrated embodiment, the raised rib 20 is a generally trapezoidal structure having a generally planar top surface 22 and first and second angled side surfaces 24A and 24B (hereafter '24' unless specifically referenced). As shown, the clip 100 has a side section or anchor portion 120 that is attached to one of the side surfaces and a tab portion 130 that extends above the top surface of the rib to engage the rail 40. In addition, the clip 100 has a central portion that is disposed between the bottom surface of the rail and the top surface 22 of the raised rib.

FIGS. 2 and 3A-3C illustrate one embodiment of the attachment clip 100 generally corresponding to the clip illustrated in FIGS. 1A and 1B. The clip 100 generally includes three separate sections, a central portion 110, the anchor portion 120 and the attachment tab portion 130. In one embodiment, the separate portions of the clip 100 are integrally formed. In one specific embodiment, the separate portions are formed out of a common piece of sheet metal. That is, the clip is formed from a flat piece of sheet metal through a stamping and bending process, which defines the separate portions of the clip. However, it will be appreciated that the present disclosure is not limited to clips made from a stamping and bending process and further includes clips formed via alternative methodologies including, without limitation, injection molding and/or casting. Likewise, such alternately formed clips may be formed of different materials including, for example, sintered metals, plastics, polymers and/or composite materials.

In the illustrated embodiment, the central portion 110 of the clip 100 defines a first generally planar surface that is configured to rest on a top surface of a raised rib of a corrugated metal roof panel. The anchor portion 120 of the illustrated embodiment defines a second generally planar surface that is configured for conformal positioning against a side surface (e.g., angled side surface 24) of the rib of the metal roof panel. In this regard, the surfaces defined by the central portion and anchor portion are oblique and/or transverse. The anchor section 120 includes one or more apertures 122, which allow the clip 10 to be affixed to the side surface of the rib utilizing a fastener(s) such as screw (e.g., machine screw) or bolt. In the illustrated embodiment, the anchor portion 120 and central portion 110 are disposed at an angle formed along a first axis A-A' (e.g., bend axis). The bend angle between these surfaces may be varied based on intended use. That is, this bend angle may be selected to substantially match an angle between the top surface of a raised rib and one of its angled side surfaces. The tab portion 130 attaches to the central portion 110 along a second axis B-B' (e.g., bend axis). Typically these axes are oblique or transverse. In the illustrated embodiment, the tab portion defines a third generally planar surface that is disposed at an oblique and/or transverse angle relative to the central portion 110. In the illustrated embodiment, the surfaces defined by each of the different portions are oblique and/or transverse to one another. When the central portion 110 is positioned on the top surface of a raised rib 20, the anchor portion 120 rests along a side surface of the raised rib for attachment to the rib while the tab portion 130 extends above the top surface of the rib to provide a structure to which a rail or other element may be attached. See, e.g., FIG. 1B. Generally, the clip is a multi-surface element that provides separate surfaces to engage a top surface of a rib and a side surface of a rib while providing another surface to attach to a structure disposed on the metal roof. Though describes as planar surfaces for purposes of discussion, it will be appreciated that the clip is not limited to use of planar surfaces. That is, one or more of the surface may be non-planar depending on, for example, the geometry of a rib to which the clip attaches and/or the geometry of an element that attaches to the metal roof.

To permit attachment of a rail or other element to the clip 100, the tab 130 also includes one or more apertures 132. In the illustrated embodiment, the tab aperture 132 is an elongated aperture that allows a limited amount of relative movement between the rail, or other attached element, and the corrugated metal panel. See FIGS. 3A-3C. That is, when a fastener is disposed through the elongated aperture and threaded into the rib, the clip may move along the length of the elongated aperture without applying forces to the fastener. Such an elongated aperture permits relative movement caused by thermal expansion and contraction of the metal roof preventing a fastener (e.g., screw) from being repeatedly stressed, which can result in the fastener loosening (e.g., wobbling in its threaded connection with the rib) or being cut over time.

One benefit of the illustrated clip 100 is that its configuration allows for reversible application of the clip. In this regard, two identically configured clips may be attached to a single rib to provide first and second attachment points on opposing sides of, for example, a rail disposed between the tab portions of the two clips. As illustrated in FIG. 4, a pair of identically configured clips 100A and 100B are attached to a common raised rib 20. The first clip 100A is disposed on the rib 20 such that its anchor portion 120A is disposed on a first angled side 24A of the rib 20. The second clip 100B, which is identically configured to the first clip, is reversed and disposed on the same rib 20 in an opposite configuration. In this regard, the anchor portion 120B of the second clip 100B is disposed on a second angled side 24B of the rib 20. In such an arrangement, the tab portions 130A and 130B of the two clips 100A and 100B define a space 'S' between their inside or facing surfaces. This permits the insertion of a rail or other element between the inside surfaces of the tab portions. Once inserted, such a rail or other element may be secured on opposing sides using first and second fasteners. See, for example FIGS. 6A-6D which shows a side views of opposing clips with the rib removed for purposes of illustration.

Insertion of a rail between opposing clips 100A, 100B is also illustrated in FIG. 5, which shows a side view of FIG. 4 with the rib removed for purposes of illustration. As shown, a rail 40 may be inserted between the inside surface of the tab portions 130A, 130B of the opposing clips 100A, 100B. In the illustrated embodiment, the tab portions 130A, 130B are each bent relative to their respective central portions such that an inside angle between these elements defines an acute angle. In this embodiment, the tab portions may be designed to correspond to an outside surface of a correspondingly shaped rail 40. However, it will be appreciated that the tab portions may be differently configured to engage differently configured elements as variously illustrated in FIGS. 6A-6D. During application, two clips 100 may be applied to the rib 20 and secured utilizing the fastener apertures 122 of the anchor sections. The clips may be positioned to define a desired spacing between the inside surfaces of the tab portions 130. Alternatively, one or both of the clips 100 may be left unattached to the rib 20 allowing a rail or other element to be disposed between the tab portions 130. Once the rail or other element is disposed between the tab portions, the anchor portions may be affixed to the rib. That is, the rail element may be affixed to the clips prior to attaching the clips to the rib. However, this is not a requirement. In any arrangement, one or more fasteners 160 may be inserted through the tab apertures to affix the rail or other element to the clip 100. See FIGS. 6A-6D.

Figure 7:
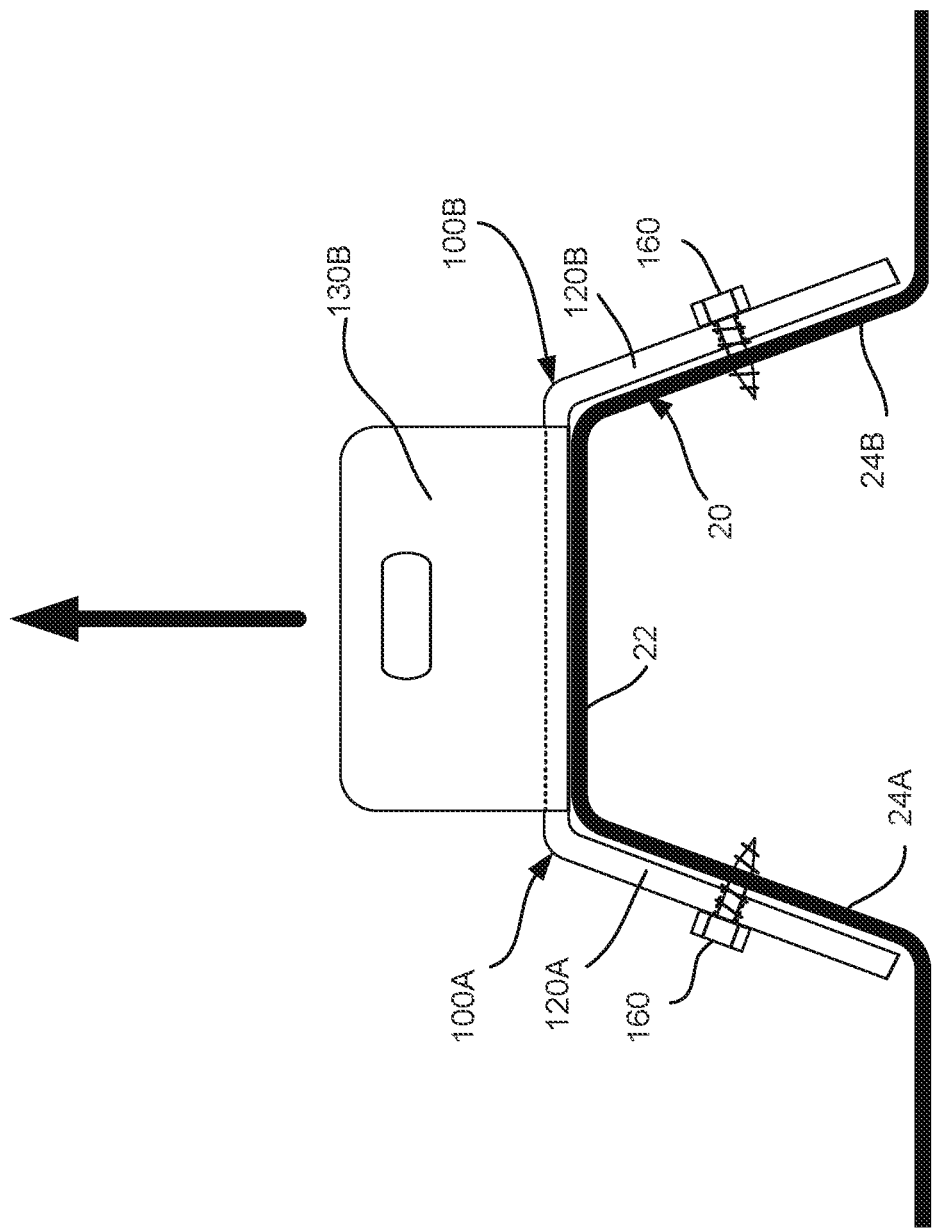
FIG. 7 illustrates an end view of FIG. 4.

FIG. 7 illustrates a cross-sectional view of the two clips 100A and 100B attached to the rib 20 as viewed from the sectional line C-C' of FIG. 4. As shown, once positioned on the rib 20, the anchor section 120A and 120B of each clip 100A and 100B may be secured to its respective sidewall 24A and 24B. Once so positioned and/or secured, the central portions of each clip rest on the top surface 22 of the rib 20. The thickness of the central portions slightly elevate the rail above the top of the raised rib 20. However, such spacing is minimal. If adjacent ribs (e.g., spanned ribs) do not include clips, such minimal spacing permits the rail to flex such that weight borne by the rail is applied to the top surfaces of the adjacent ribs. That is, the diminutive thickness of the central portion of the clips permits adjacent ribs to carry weight loads applied by rails attached to the clips.

The use of the anchor sections 120 that attach to the side surfaces 24 of the ribs provides another significant benefit for the disclosed devices and systems. Specifically, the side attachment provides significantly increased pullout strength for the structures attached to the clips. As shown, when positioned on the rib, a central axis of the fastener aperture of the anchor portion is substantially perpendicular to the angled side surface of the rib. When a fastener(s) 160 extends through the fastener aperture(s) in the anchor sections 120 and into the side surfaces 24 of the rib a body of the fastener is generally perpendicular to the anchor portion and angled side surface. When an upward force (e.g., a force normal to the top surface of the rib as illustrated by the arrow in FIG. 7) is applied to a rail or other element secured to the clips, the fasteners 160 experience a shear force exerted between the side surface 24 and the anchor portion 120. By way of example, rails attached to the clips are often utilized to secure solar panels to a roof surface. Such solar panels provide a significant area that is subject to wind loading. Such wind loading may apply a downward force to the roof, which may be spread to adjacent ribs as discussed above. However, such wind loading may also result in a wind uplift load (e.g., pressures from wind flow that cause lifting effects). Previous attachment clips that attached directly to the top surface of the rib provided limited wind resistance. More specifically, rib top connection is typically limited to the thread pullout strength of the number of the fasteners attaching the rails to the ribs. The overall pull out strength of such a system is typically limited to a collective thread stripping strength between one or more threaded fasteners and the thin metal sheet(s) that form the top of the ribs. In contrast, the pullout strength of the presented clips is dictated by the shear strength of the fasteners 160 due to the physical configuration of the clips. Accordingly, the clips provide significant improvement to the overall pull out strength of a rail system secured to a roof surface.

Figure 8B:
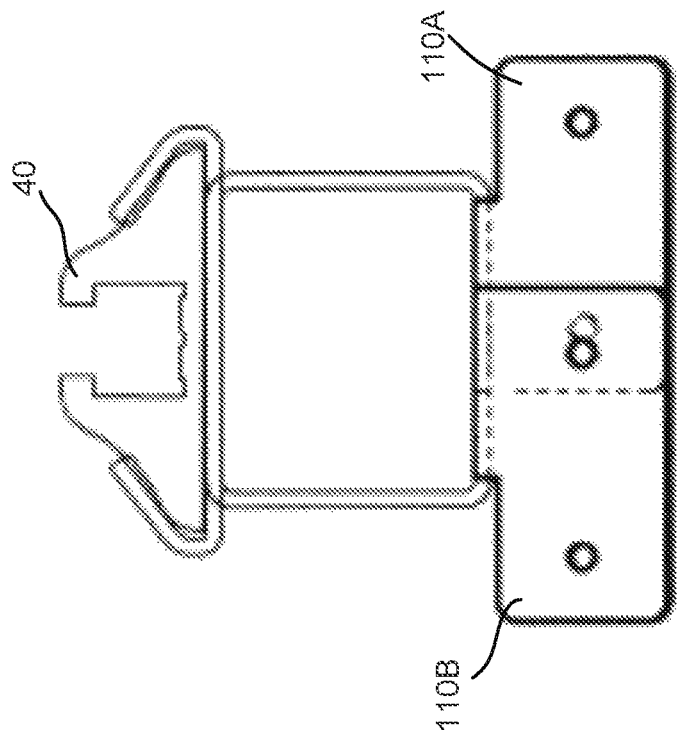
FIGS. 8A and 8B illustrate a further alternate embodiment of the attachment clip.
Figure 8A:
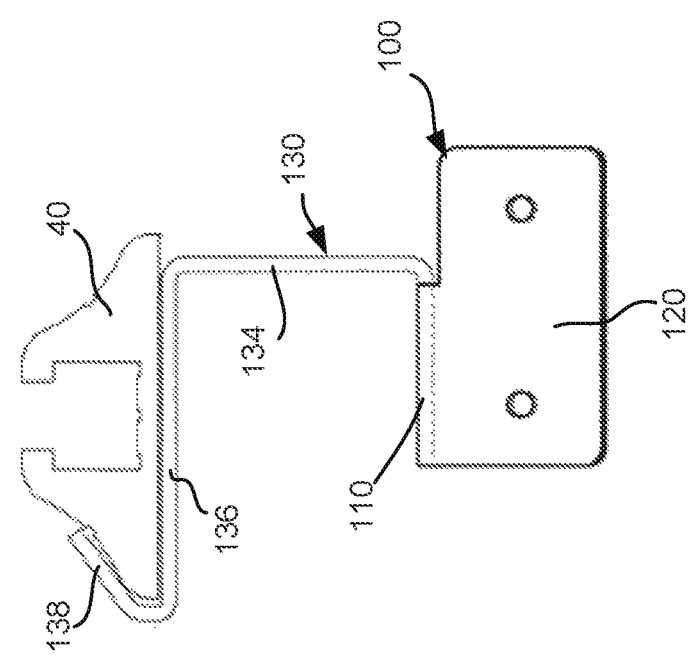

Though discussed above in relation to one embodiment of the clip, it will be appreciated that variations may be made. For instance, the angles between the various portions of the clip may be varied as required by the geometry of the panel to which they will be applied. Furthermore, the tab portion may be further configured to provide a standoff such a significant space exists between the roof surface in the bottom of the supported rail or other element. Such configuration is shown in FIGS. 8A and 8B. As shown, this embodiment of the clip 100 includes a tab portion 130 having an upright leg 134, a horizontal leg 136 and an attachment tab 136. Again, two of these identical clips may be disposed on a common rib to provide a space between the attachment tabs to engage a rail as illustrated in FIG. 8B. In such an arrangement, clips may be applied to adjacent ribs to evenly spread the weight of a structure over the surface of the roof. However, this is not requirement.

Additional variations are possible. As shown in FIG. 9, in some arrangements, a top edge 126 of the anchor portion 120 may be modified to better shed water. That is, the top edge may be sloped to allow water to drain. As shown in FIG. 10, an adhesive 190 or adhesive membrane may be applied to the bottom surface of the central portion 110 to improve connection with a rib. Likewise, such an adhesive and/or adhesive membrane (e.g., peel and stick membrane) may be applied to the bottom surface of the rail to adhere the rail to spanned ribs. Further, the tab portion may include multiple apertures to facilitate connection with differing structures.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure as claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of the presented inventions as defined by the appended claims. Whenever a range is given in the specification, all intermediate ranges and subranges, as well as all individual values included in the ranges given are intended to be included in the disclosure.

What is claimed is:

1. A clip for mounting elements to a metal roof, the metal roof having one or more metal panels each having at least one rib that is generally trapezoidal in cross-section and having a generally planar top surface and first and second angled side surfaces, each clip comprising:

a central portion having a first planar surface configured for positioning on the top surface of the rib;

a anchor portion having a second planar surface connected to said central portion and configured for positioning against one of the first and second angled side surfaces of the rib when said central portion is positioned on the top surface of the rib, said anchor portion having at least a first fastener aperture, wherein said first planar surface and said second planar surface are disposed in oblique planes;

a tab portion having a third planar surface connected to said central portion and configured to extend above the top surface of the rib when said central portion is positioned on the top surface of the rib, said tab portion having at least a second fastener aperture, wherein said third planar surface is oblique to both said first planar surface and said second planar surface and an angle between said third planar surface said first planar surface is acute and wherein said central portion, said anchor portion and said tab portion are integrally formed from a common sheet of metal.

2. The clip of claim 1, wherein said second planar surface is disposed at an angle relative to said first planar surface, said angle being substantially equal to an angle between the top surface of the rib and one of the first and second angled side surfaces of the rib.

3. The clip of claim 1, wherein said first fastener aperture of said anchor portion has a central axis substantially perpendicular to the angled side surface of the rib when the clip is positioned on the rib, wherein a body of a fastener extending through said first fastener aperture is in shear between said anchor portion and the angled side surface upon application of force to the clip that is at least partially normal to the top surface of the rib.

4. The clip of claim 1, wherein a connection between said central portion and said anchor portion comprises a first bend formed in said sheet of metal along a first axis and a second connection between said central portion and said tab portion comprises a second bend formed in said sheet of metal along a second axis, wherein said first and second axes are transverse.

5. The clip of claim 1, wherein at least one of said first fastener aperture and said second fastener aperture comprises an elongated aperture.

6. The clip of claim 1, wherein said tab portion further comprises:

a vertical leg extending above said central portion when positioned on the top surface; and a horizontal leg extending generally transverse to the top surface and spaced from the top surface when said central portion is positioned on the top surface.

* * * * *